United States Patent Office 3,646,208
Patented Feb. 29, 1972

---

3,646,208
INHIBITION OF HISTIDINE DECARBOXYLASE
Edward Ervin Smissman, Lawrence, Kans., and James Allen Weis, Albany, Calif., assignors to Kansas University Endowment Association, Lawrence, Kans.
No Drawing. Filed Oct. 17, 1969, Ser. No. 867,396
Int. Cl. A61k 27/00
U.S. Cl. 424—273
9 Claims

ABSTRACT OF THE DISCLOSURE

α-Amino-β-imidazolyl-ethyl alkyl ketones as inhibitors of histidine decarboxylase.

---

This invention relates to a novel method of inhibiting histidine decarboxylase by the use of α-amino-β-[4(or 5)-imidazolyl]-ethyl lower-alkyl ketones, and to novel pharmaceutical compositions, preferably in dosage unit form, comprising such a ketone as the histidine decarboxylase inhibiting agent.

It has been found that α-amino-3-[4(or 5)-imidazolyl]-ethyl lower-alkyl ketones of the following formula, in the form of a strong mineral acid addition salt, are useful as histidine decarboxylase inhibitors:

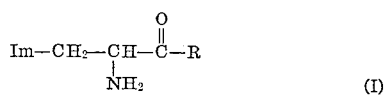

(I)

wherein Im represents 4(or 5)°-imidazolyl and R is lower alkyl. As used herein, "lower alkyl" may be a straight or branch chained saturated hydrocarbon having from 1 to about 5 carbon atoms, such as, for example, methyl, ethyl, propyl, isopropyl, butyl, pentyl and the like. The aforementioned 4(or 5)-imidazolyl moiety, i.e., Im, may be structurally illustrated by the following isomeric forms:

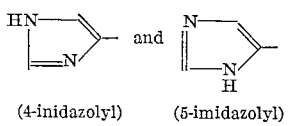

(4-imidazolyl)    (5-imidazolyl)

The compounds of Formula I may be readily obtained from histidine as the starting material, which accounts for the tautomeric forms above since it is generally recognized that in histidine, the imidazole hydrogen may be located on either nitrogen. Thus, Merck Index (8th edition, page 532) names histidine as α-amino-4(or 5)-imidazolepropionic acid, indicating the existence of histidine as a mixture of both tautomers.

The subject compounds (I), in the form of an acid addition salt, are obtained by treating histidine (II) with an appropriate acid anhydride (III) or acyl halide (IV), preferably the chloride or bromide, in the presence of a suitable base, e.g., sodium acetate, pyridine, under typical Dakin-West reaction conditions to yield the acylamino ketone of Formula V which may then be hydrolyzed under acidic conditions, for example, in the presence of excess strong mineral acid, such as sulfuric acid, nitric acid and the like, and, preferably hydrochloric acid, to yield the desired compound of Formula I as the corresponding acid addition salt. The foregoing reaction scheme may be illustrated as follows, in which R and Im are as previously described:

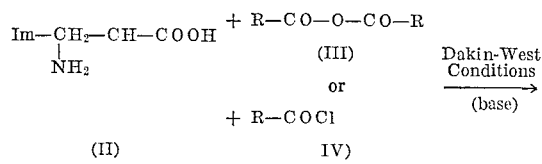

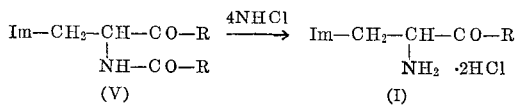

Histidine decarboxylase is the naturally occurring enzyme involved in the conversion of the amino acid, histidine, to histamine, the latter having been reported as a contributing factor in such diseased states as gastric ulcers, inflammation and allergic rhinitis. Thus, substances which would decrease the amount of histamine formation by inhibiting the action of histidine decarboxylase would be expected to have a beneficial effect on these diseased states. The subject compounds (I), in the form of a strong mineral acid addition salt, have now been found to be effective inhibitors of histidine decarboxylase. As shown in the examples hereinafter, effective inhibition is observed in vitro, based on 1.0 mg. of enzyme, at concentrations of about at least $1 \times 10^{-6}$ M and $I_{50}$ concentrations range from about $1 \times 10^{-4}$ to about $1 \times 10^{-5}$ M ($I_{50}$=the molar concentration for 50% inhibition).

In view of the foregoing, there is provided herein a novel method of producing histidine decarboxylase inhibition by contacting said enzyme with an effective amount of an α-amino-β-[4(or 5)-imidazolyl]-ethyl lower-alkyl ketone of Formula I, in the form of a strong mineral acid addition salt, as the inhibiting agent. There is further provided a method of producing such inhibition which comprises administering internally to a warm blooded animal a pharmaceutical composition comprising an effective amount of said inhibiting agent in admixture with a pharmaceutical carrier.

To prepare the pharmaceutical compositions of this invention an α-amino-β-[4(or 5)-imidazolyl]-ethyl lower-alkyl ketone of Formula I as a strong mineral acid addition salt thereof is combined as the active ingredient in intimate admixture with a pharmaceutical carrier according to conventional pharmaceutical compounding techniques, which carrier may take a wide variety of forms depending on the form of preparation desired for administration, e.g., oral, parenteral, etc. In preparing the compositions in oral dosage form, any of the usual pharmaceutical media may be employed, such as, for example, water, glycols, oils, alcohols and the like in the case of oral liquid preparations such as suspensions, elixirs and solutions; or solid carriers such as starches, sugars, lubricants, binders, disintegrating agents and the like in the case of powders, capsules and tablets. Because of their ease in administration, tablets and capsules represent the most advantageous oral dosage unit form, in which case solid pharmaceutical carriers are obviously employed. For parenterals, the carrier will usually comprise sterile water, particularly with the water-soluble salts of Formula I, though other ingredients, for example, to aid solubility or for preservative purposes, may be included. Injectable solutions, for example, may be prepared in which the carrier comprises saline solution, glucose solution or a mixture of both. Injectable suspensions may also be prepared, in which case appropriate liquid carriers, suspending agents and the like may be employed.

The pharmaceutical compositions herein will contain, per dosage unit, e.g., tablet, capsule, powder, injection, teaspoonful and the like, from about 50 to about 1000 mg. of the active ingredient, and, preferably, from about 50 to about 500 mg.

EXAMPLE I

4-[4(or 5)-imidazolyl]-3-acetamido-2-butanone hydrochloride

Acetic acid anhydride (141 g., 1.43 mole) and pyridine (94.5 g., 1.19 mole) are added to L-histidine hydrochloride monohydrate (50 g., 0.24 mole). With magnetic stirring the mixture is heated until gas evolution commences (70° C.). External heating is stopped as the temperature rises spontaneously to 100° C. After 5 minutes, gentle heating is applied to maintain the reaction temperature around 90° C. for 15 min. The mixture is allowed to cool. Excess violatile reactants are removed by spin-distillation in vacuo. Trace amounts of volatile reactants are then removed by steam distillation. The resulting aqueous solution is decolorized with activated charcoal. Excess water is removed by spin-distillation in vacuo. The resulting orange gum is dissolved in an equal volume of isopropanol, and seed crystals from a previous reaction are added. The resultant crystallized mass is broken up, and additional isopropanol is added to make a filterable slurry. The crystals are collected and recrystallized twice from hot isopropanol affording 4-[4(or 5)-imidazolyl]-3-acetamido-2-butanone hydrochloride, 35.4 g. (64%): M.P. 165–168° C.

Analysis.—Calc'd. for $C_9H_{12}N_3O_2Cl$ (percent): C, 46.66; H, 6.09; N, 18.14. Found (percent): C, 46.57; H, 6.31; N, 18.02.

EXAMPLE II

The procedure of Example I is repeated except that an equivalent quantity of proprionic acid anhydride, butyric acid anhydride and isobutyric acid anhydride, respectively, is used in place of the acetic acid anhydride employed therein to yield, as respective products:

5-[4(or 5)-imidazolyl]-4-propionamido-3-pentanone hydrochloride;
6-[4(or 5)-imidazolyl]-5-butyramido-4-hexanone hydrochloride; and
5-[4(or 5)-imidazolyl]-4-isobutyramido-2-methyl-3-pentanone hydrochloride.

EXAMPLE III

4-[4(or 5)-imidazolyl]-3-amino-2-butanone dihydrochloride

4-[4(or 5)-imidazolyl]-3-acetamido-2-butanone hydrochloride (12 g., 52 mmole) is dissolved in 120 ml. of 4 N hydrochloric acid. The solution is stirred magnetically and refluxed 3 hr. Excess water is removed by distillation in vacuo. Trace amounts of water are removed by codistillation with isopropanol in vacuo. The crystalline residue is collected and washed with isopropanol. Recrystallization from a methanol-isopropanol mixture provides yellow crystals (82% theoretical yield) of 4-[4(or 5)-imidazolyl]-3-amino-2-butanone dihydrochloride, M.P. 212–215° C.

Analysis.—Calc'd for $C_7H_{13}N_3OCl_2$ (percent): C, 37.18; H, 5.80; N, 18.58. Found (percent): C, 36.92; H, 6.05; N, 18.68.

In accordance with Example V, 4-[4(or 5)-imidazolyl] 3-amino-2-butanone dihydrochloride has an $I_{50}$ of $5 \times 10^{-5}$ M.

EXAMPLE IV

By repeating the acid hydrolysis procedure of Example III, except that an equivalent quantity of each product obtained in Example II is substituted, respectively, for the starting acylamino ketone used in Example III, there are obtained, as respective products:

5-[4(or 5)-imidazolyl]-4-amino-3-pentanone dihydrochloride;
6-[4(or 5)-imidazolyl]-5-amino-4-hexanone dihydrochloride; and
5-[4(or 5)-imidazolyl]-4-amino-2-methyl-3-pentanone dihydrochloride.

EXAMPLE V

This example demonstrates the enzyme inhibiting action of the subject compounds (I) on histidine decarboxylase. The compound to be tested is dissolved in water and added to a mixture containing 100 micromoles ($\mu$moles) of potassium phosphate buffer (pH 6.8), 0.25 $\mu$mole L-histidine containing 0.25 microcurie of L-histidine-carboxyl-$^{14}$C, 0.01 $\mu$mole of pyridoxal-5-phosphate and 1.0 mg. of rat fetal histidine decarboxylase [purified according to F. J. Leinweber, Mol. Pharmacol., 4, 337–48 (1968)] in a final volume of 1.0 ml. The mixture is incubated at 37° C. for 2 hours. Estimation of $^{14}CO_2$ produced [according to F. J. Leinweber et al., Anal. Biochem., 21, 131–4 (1967)] is used in determining enzyme inhibition. In accordance with this procedure, the $I_{50}$ of the subject compounds, preferably in the form of a strong mineral acid addition salt, is about $1 \times 10^{-4}$ to about $1 \times 10^{-5}$ M ($I_{50}$=molar concentration for 50% solution).

EXAMPLE VI—Capsules 10,000 hard gelatin capsules, each containing as the active ingredient (A.I.) 250 mg. of 4-[4(or 5)-imidazolyl]-3-amino - 2 - butanone dihydrochloride are prepared from the following formulation:

|  | Grams |
|---|---|
| A.I. | 2,500 |
| Lactose | 1,500 |
| Starch | 400 |
| Talc | 400 |
| Calcium stearate | 10 |

A uniform mixture of the active and supplementary ingredients is prepared and filled into two-piece hard gelatin capsules.

EXAMPLE VII—Tablets 5,000 compressed tablets, each containing as the active ingredient 50 milligrams of 4-[4(or 5)-imidazolyl]-3-amino-2-butanone dihydrochloride are prepared from the following formulation:

|  | Grams |
|---|---|
| A.I. | 250 |
| Starch | 375 |
| Dibasic calcium phosphate hydrous | 2,500 |
| Calcium stearate | 10 |

The finely powdered ingredients are mixed well and granulated with 10% starch paste. The granulation is dried and compressed into tablets using starch as a disintegrant and calcium stearate as a lubricant.

EXAMPLE VIII—Injectable

The following formulation provides 1 liter of a parenteral solution comprising 50 mg. of 4-[4(or 5)-imidazolyl]-3-amino-2-butanone dihydrochloride as the active ingredient per milliliter:

|  | Grams |
|---|---|
| A.I. | 50.0 |

Water for injection, U.S.P., q.s. ad 1 liter.

The solution is autoclaved to insure sterility and placed into sterile vials. Bacteriostatic agents commonly employed as adjuvants in parenteral solutions may be added to the above formulation.

EXAMPLE IX—Oral Liquid

The following formulation provides 1 liter of solution suitable for oral administration comprising 500 mg. of 4-[4(or 5)-imidazolyl - 3 - amino - 2 - butanone dihydrochloride as the active ingredient per teaspoonful (5 mls.).

|  | Grams |
|---|---|
| A.I. | 100.0 |
| Sugar | 400.0 |
| Na benzoate | 1.0 |
| Citric acid, hydrous | 1.0 |
| Na saccharin | 2.0 |
| Na cyclamate | 20.0 |
| FD & C Red No. 2 certified | 0.01 |
| Wild cherry flavor | 1.07 |

Water, q.s. ad 1000 ml.

EXAMPLE X

This example demonstrates the percent inhibition of histidine decarboxylase obtained with varying amounts of the preferred compound, 4-[4(or 5)-imidazolyl]-3-amino-2-butanone dihydrochloride, according to the test procedure outlined in Example V.

| Concentration: | Percent inhibition |
|---|---|
| $1 \times 10^{-3}$ M | 90 |
| $1 \times 10^{-4}$ M | 75 |
| $5 \times 10^{-5}$ M | 50 |
| $1 \times 10^{-5}$ M | 25 |
| $1 \times 10^{-6}$ M | 10 |
| $1 \times 10^{-7}$ M | Essentially none |

EXAMPLE XI

This example illustrates a method of determining the inhibition of histidine decarboxylase in rats. The compound to be tested is injected intraperitoneally into male Sprague-Dawley rats (approx. 175–200 g. in weight). After 1 hr., the animals are sacrificed, and the pyloric portion of the stomach (containing the histidine decarboxylase activity) is removed, homogenized in 3 volumes of saline and then centrifuged at 25,000 times gravity for 30 minutes. Histidine decarboxylase activity is then determined on 0.25 ml. aliquots by measuring $^{14}CO_2$ released from L-histidine-carboxyl-$^{14}$C. An incubation mixture containing 0.1 M sodium phosphate buffer (pH 6.8), $5 \times 10^{-4}$ M L-histidine containing 0.5 microcurie of L-histidine-carboxyl-$^{14}$C is prepared to which is added the aforementioned 0.25 ml. aliquot and water to a final volume of 1.0 ml. The mixture is incubated at 37° C. for 1 hour and the $^{14}CO_2$ released is determined. The following data was obtained using the indicated doses of 4-[4(or 5)-imidazolyl]-3-amino-2-butanone dihydrochloride as the enzyme inhibitor.

| Dose (mg./kg.): | Percent inhibition |
|---|---|
| 200 | 62 |
| 100 | 37 |
| 50 | 22 |
| Control (without inhibitor) | 0 |

Although the previously described strong mineral acid addition salts of (I) are the preferred embodiments of this invention, it is also intended that other pharmaceutically acceptable acid addition salts of (I), derived from organic and weak mineral acids, are to be included within the scope of this invention. Such other acid addition salts may be readily obtained by conventional exchange techniques involving conversion of the heretofore described strong mineral acid addition salts to the desired pharmaceutically acceptable acid addition salts. Typical exchange techniques include the use of anion-exchange resins, such as, for example the commercially available Dowex type or IR type resins. Illustrative of the other pharmaceutically acceptable acid addition salts embraced herein are those whose acid moiety include organic acids such as acetic, fumaric, citric, succinic, malic, maleic, tartaric, benzoic, p-toluenesulfonic, cyclamic and the like, and weak mineral acids such as boric, phosphoric and the like.

What is claimed is:

1. A pharmaceutical composition for inhibiting histidine decarboxylase in dosage unit form comprising per dosage unit from about 50 to about 1000 mg. of a strong mineral acid addition salt of an α-amino-β-imidazolyl-ethyl lower-alkyl ketone of the formula:

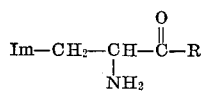

wherein Im is 4(or 5)-imidazolyl and R is lower-alkyl, in admixture with a pharmaceutical carrier.

2. Claim 1 wherein said dosage unit form is a tablet and said ketone salt is 4-[4(or 5)-imidazolyl]-3-amino-2-butanone dihydrochloride.

3. Claim 1 wherein said dosage unit form is a capsule and said ketone salt is 4-[4(or 5)-imidazolyl]-3-amino-2-butanone dihydrochloride.

4. A liquid pharmaceutical composition for inhibiting histidine decarboxylase comprising from about 50 to about 1000 mg. per dosage unit of a strong mineral acid addition salt of an α-amino-β-imidazolyl-ethyl lower-alkyl ketone of the formula:

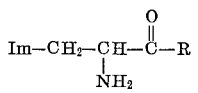

wherein Im is 4(or 5)-imidazolyl and R is lower-alkyl, in a liquid medium suitable for oral administration.

5. Claim 4 wherein said ketone salt is 4-[4(or 5)-imidazolyl]-3-amino-2-butanone dihydrochloride.

6. An injectable pharmaceutical composition for inhibiting histidine decarboxylase comprising from about 50 to about 1000 mg. per dosage unit of a strong mineral acid addition salt of an α-amino-β-imidazolyl-ethyl lower-alkyl ketone of the formula:

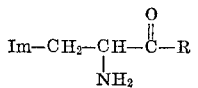

wherein Im is 4(or 5)-imidazolyl and R is lower-alkyl, in a liquid medium suitable for parenteral administration.

7. Claim 6 wherein said ketone salt is 4-[4(or 5)-imidazolyl]-3-amino-2-butanone dihydrochloride.

8. The method of producing histidine decarboxylase inhibition which comprises administering internally to a warm-blooded animal a pharmaceutical composition for inhibiting histidine decarboxylase comprising an effective inhibiting amount of a strong mineral acid addition salt of an α-amino-β-imidazolyl-ethyl lower-alkyl ketone of the formula:

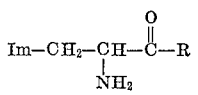

wherein Im is 4 (or 5)-imidazolyl and R is lower-alkyl, as the histidine decarboxylase inhibiting agent in admixture with a pharmaceutical carrier.

9. The method of claim 8 wherein said ketone salt is 4-[4(or 5)-imidazolyl]-3-amino-2-butanone dihydrochloride.

References Cited

Dakin et al.: J. Biol. Chem. vol. 78, pp, 745–756 (1928).

STANLEY J. FRIEDMAN, Primary Examiner

PO-1050
(5/69)

UNITED STATES PATENT OFFICE
CERTIFICATE OF CORRECTION

Patent No. 3,646,208    Dated Feb. 29, 1972

Inventor(s) Edward Ervin Smissman, Lawrence Kans, and Allen Weis

It is certified that error appears in the above-identified patent and that said Letters Patent are hereby corrected as shown below:

In Column 1, line 22 "$\alpha$-amino-3-[4(or 5)-imidazolyl]" should read --- amino - $\beta$ -[4(or 5)-imidazolyl]---.

In Column 1, line 31, "4(or 5)°" should read--- 4(or 5)---.

Signed and sealed this 1st day of August 1972.

(SEAL)
Attest:

EDWARD M. FLETCHER, JR.    ROBERT GOTTSCHALK
Attesting Officer          Commissioner of Patents